(12) United States Patent
Molina (10) Patent No.: US 9,828,140 B1
(45) Date of Patent: Nov. 28, 2017

(54) CONTAINER WITH INVERTED HOOK-SHAPED HANDLE

(71) Applicant: Gloria Molina, Wilson, NC (US)

(72) Inventor: Gloria Molina, Wilson, NC (US)

( * ) Notice: Subject to any disclaimer, the term of this patent is extended or adjusted under 35 U.S.C. 154(b) by 306 days.

(21) Appl. No.: 14/338,857

(22) Filed: Jul. 23, 2014

(51) Int. Cl.
*G01F 17/00* (2006.01)
*B65D 25/28* (2006.01)
*G01F 19/00* (2006.01)

(52) U.S. Cl.
CPC ..... *B65D 25/2885* (2013.01); *B65D 25/2802* (2013.01); *G01F 19/00* (2013.01)

(58) Field of Classification Search
CPC ........ G01F 19/00; G01F 19/002; G01F 17/00; G01F 22/00; G01F 23/20
USPC ........ 215/396, 398, 399; 206/141, 142, 143, 206/163, 164; 73/426, 427, 149
See application file for complete search history.

(56) References Cited

U.S. PATENT DOCUMENTS

| | | | | |
|---|---|---|---|---|
| 2,126,584 A * | 8/1938 | Small | ...................... | A47J 31/12 126/377.1 |
| 3,716,871 A * | 2/1973 | Borse | ...................... | A61G 9/006 215/398 |
| 4,607,755 A * | 8/1986 | Andreozzi | ......... | A47G 19/2266 215/229 |
| 5,108,016 A | 4/1992 | Waring | | |
| 5,572,872 A | 11/1996 | Hlavacek | | |
| 5,823,046 A | 10/1998 | Schagerstrom et al. | | |
| 6,719,951 B1 * | 4/2004 | Griffith | ................ | A61B 10/007 215/396 |
| 6,769,302 B1 * | 8/2004 | King | ....................... | G01F 19/00 73/426 |
| 6,832,705 B2 | 12/2004 | Hollander et al. | | |
| D562,159 S * | 2/2008 | Griffith | ....................... | D10/46.2 |
| 7,665,359 B2 | 2/2010 | Barber | | |
| 7,959,034 B2 | 6/2011 | Faaborg et al. | | |
| D642,080 S * | 7/2011 | Schmitt | ........................ | D10/46.2 |
| D660,186 S * | 5/2012 | Williams | ..................... | D10/46.2 |
| 275,063 A1 | 8/2014 | Greene | | |
| D743,279 S * | 11/2015 | Schwartz | .................... | D10/46.2 |
| 2006/0277994 A1 | 12/2006 | Peterson | | |
| 2007/0012707 A1 | 1/2007 | Rattay | | |
| 2007/0068250 A1 * | 3/2007 | Krent | ....................... | G01F 19/00 73/427 |
| 2007/0246488 A1 | 10/2007 | Cash et al. | | |

(Continued)

*Primary Examiner* — Eric S McCall
*Assistant Examiner* — Mohammed E Keramet-Amircola
(74) *Attorney, Agent, or Firm* — H. John Rizvi; Gold & Rizvi, P.A.

(57) ABSTRACT

A container for containing generally flowable solid or liquid materials and capable of being hung in an inverted position is provided. The container includes a container body and a protruding hook-shaped handle, wherein the hook-shaped handle is arranged in L-shaped or inverted-hook configuration according to which a hooking space is formed oriented towards a top rim of the container. By hanging the container in an inverted position, the container is able to rapidly rinse and dry out after washing, while keeping the container top rim in the air and avoiding contamination of the container. The hook-shaped handle further allows the container to be conveniently and temporarily hung from a bowl sidewall, taking up no countertop or table space. The hook-shaped handle preferably protrudes from the base of the container to contribute to container stability when placed in an upright position.

19 Claims, 6 Drawing Sheets

(56) References Cited

U.S. PATENT DOCUMENTS

| | | | | |
|---|---|---|---|---|
| 2008/0017540 A1* | 1/2008 | Sawhney | ............... | G01F 19/00 |
| | | | | 206/514 |
| 2009/0044622 A1* | 2/2009 | Barber | ................... | G01F 19/00 |
| | | | | 73/426 |
| 2009/0158844 A1* | 6/2009 | DiPietro | ................ | B29C 45/16 |
| | | | | 73/427 |
| 2009/0183565 A1* | 7/2009 | Shamoon | ............... | G01F 19/00 |
| | | | | 73/426 |
| 2009/0255333 A1* | 10/2009 | Henry | .................... | G01F 19/00 |
| | | | | 73/427 |
| 2010/0058856 A1* | 3/2010 | Yinko | ............... | G01F 23/2962 |
| | | | | 73/290 V |
| 2010/0089152 A1* | 4/2010 | Kolada | .................. | G01F 19/00 |
| | | | | 73/426 |
| 2011/0061459 A1* | 3/2011 | Farber | .................... | G01F 19/00 |
| | | | | 73/427 |
| 2011/0073515 A1* | 3/2011 | Tai | .................... | B65D 21/0233 |
| | | | | 206/505 |
| 2012/0324997 A1* | 12/2012 | Tharp | .................... | G01F 19/00 |
| | | | | 73/427 |
| 2014/0319095 A1* | 10/2014 | Quinn | ................... | B65D 41/26 |
| | | | | 215/365 |

\* cited by examiner

CONTAINER WITH INVERTED HOOK-SHAPED HANDLE

FIELD OF THE INVENTION

The present invention relates generally to containers, and more particularly, to a container in the form of a cup, jar, bowl, mug or the like that can be used for storing flowable solid or liquid materials to be transferred from one place to another, with the container having an inverted-hook handle configuration that facilitates hanging the container in an inverted orientation.

BACKGROUND OF THE INVENTION

In the latter half of the Nineteenth Century, the Domestic Science Movement arose to apply scientific principles to various aspects of running and maintaining a household. This scientific approach was referred to as Home Economics, and is now known as Family and Consumer Science. The Movement was furthered by the Morrill Act in 1862, and gave rise to the establishment of cooking schools throughout the United States.

One significant development of the Domestic Science Movement was the introduction of standardized measurements in household activities, particularly in cooking. For most of history, most cookbooks did not specify quantities precisely, instead talking of "a nice leg of spring lamb", a "cupful" of lentils, a piece of butter "the size of a walnut", and "sufficient" salt. Informal measurements such as a "pinch", a "drop", or a "hint" (soupçon) were common (and in some instances still used today).

In the late 1800's, standard measures by weight were impractical due to the unreliability and expense of scales at the time. Consequently, measurement by volume was used. In the US, Fannie Farmer introduced the more exact specification of quantities by volume in her 1896 *Boston Cooking-School Cook Book*. Developed at the same time was the graduated measuring cup with indicia representing a scale marked in cups and fractions of a cup. The graduated cup allows the cook to use a single container to measure various quantities, eliminating the need for multiple cups.

Measuring cups may be made of plastic, glass, ceramics, or metal. Transparent (or translucent) cups can be read from an external scale; metal ones only from a scale marked on the inside. Measuring cups often feature a handle to facilitate filling, transfer, and emptying of the cup. Known handles typically take the form of a bar extending downwardly from the top of the cup, or a loop attached to the top and bottom of the cup.

Known measuring cups provide many benefits, but at the same time present several drawbacks. For example, known measuring cups do not provide a means by which they can be conveniently and cleanly stored in anticipation of use. Further, known measuring cups fail to provide any means by which they can be hung for draining between uses or after washing.

Accordingly, there is an established need for a container, and for a measuring cup in particular, that can be conveniently and cleanly stored in anticipation of use, and that can be hung for draining between uses or after washing.

SUMMARY OF THE INVENTION

The present invention is directed to a container for containing solid or liquid flowable substances, such as, but not limited to, a cooking ingredient measuring cup. The container in accordance with the invention is capable of being hung upside down with the container opening facing downward, for easy storage of the container, convenient hanging of the container onto a bowl sidewall when not in use, or rapid rinsing and drying after washing the container. Such inverted-hanging capability is provided by a hook-shaped handle, serving a double function: on one hand, the handle provides a gripping portion to be grasped by a user for manipulating the container, as known in the art; on another hand, the handle is substantially hook-shaped and arranged in an inverted configuration for the hood to be oriented upwards, towards a bowl rim, allowing to serve as a hook through which to hang the container on a bowl, bar, peg, rope or the like.

In accordance with one embodiment of the present invention, the invention consists of a container for containing flowable material, said container comprising:

a container body having a top rim, a bottom, and at least one side, the container body being adapted and constructed to contain flowable material; and a handle, comprising:
a connecting portion extending outwardly form the container body in a first direction, and
a gripping portion extending from said connecting portion in a second direction different to said first direction, said gripping portion terminating in a free end, wherein said connecting portion and said gripping portion are arranged in a hook-like configuration; whereby
a hooking space is delimited between said container body, said connecting portion and said gripping portion, said hooking space being oriented towards the container body top rim.

In a second aspect, the connecting portion extends outwardly from the bottom of the container body.

In another aspect, the connecting portion extends radially from the container body.

In another aspect, the gripping portion extends axially towards the container body rim.

In another aspect, the container further comprises a spout formed on the top rim of the container body.

In another aspect, the spout is arranged radially oppositely to the handle.

In another aspect, the container further includes a base comprising a bottom surface for stably resting on a flat surface.

In another aspect, the handle connecting portion extends at least partially from the base.

In another aspect, the handle connecting portion comprises a bottom surface that is coplanar to the bottom surface of the base.

In another aspect, the base protrudes radially outwardly from the bottom of the container body.

In another aspect, the container is formed from at least one of glass, plastic, metal, ceramic, porcelain, rubber and any combination thereof.

In another aspect, the container handle and the container body are integrally formed.

In another aspect, the container further comprises indicia defining graduated measurement markings on at least one side of the container body.

Introducing a second embodiment of the invention, the invention consists of a container for containing at least one solid or fluid material, said container comprising:

a container body having an open top defining a top rim, a closed bottom, and at least one side wall, the container body being adapted and constructed to contain at least one solid or fluid material; and a hook-shaped handle protruding from the body and oriented towards the top rim, where a free end of the hook-shaped handle is arranged closer to the top rim than a connecting portion between the handle and the container body, said hook-shaped handle defining an inner hooking space oriented towards said top rim.

In a second aspect, the connecting portion extends radially from the container body and the gripping portion extends axially towards the container body rim.

In another aspect, the handle connecting portion extends at least partially from a bottom surface of said closed bottom, and coplanar to said bottom surface.

In yet another embodiment of the invention, the present invention consists of a container for containing solid or fluid substances, said container comprising:

a container body having a base, side walls and a top rim, the container body being adapted and constructed to contain solid or fluid substances; and a handle formed integral to the container body, said handle consisting of:
  a connecting portion extending outwardly from the container body, and
  a gripping portion extending from said connecting portion, wherein
  said connecting portion and said gripping portion are arranged in a L-shaped configuration; whereby
a hooking space is delimited between said container body, said connecting portion and said gripping portion, said hooking space being oriented towards the container body top rim.

In a second aspect, the handle connecting portion extends outwardly from the base of the container body.

In another aspect, the handle connecting portion comprises a bottom surface that is coplanar to a bottom surface of the base.

In another aspect, the base protrudes radially outwardly from the bottom of the container body.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a container for containing flowable material, the container being provided with an inverted handle allowing the container to be held normally when in use, and to be hung upside down when not in use or after having been washed.

Figure 1:
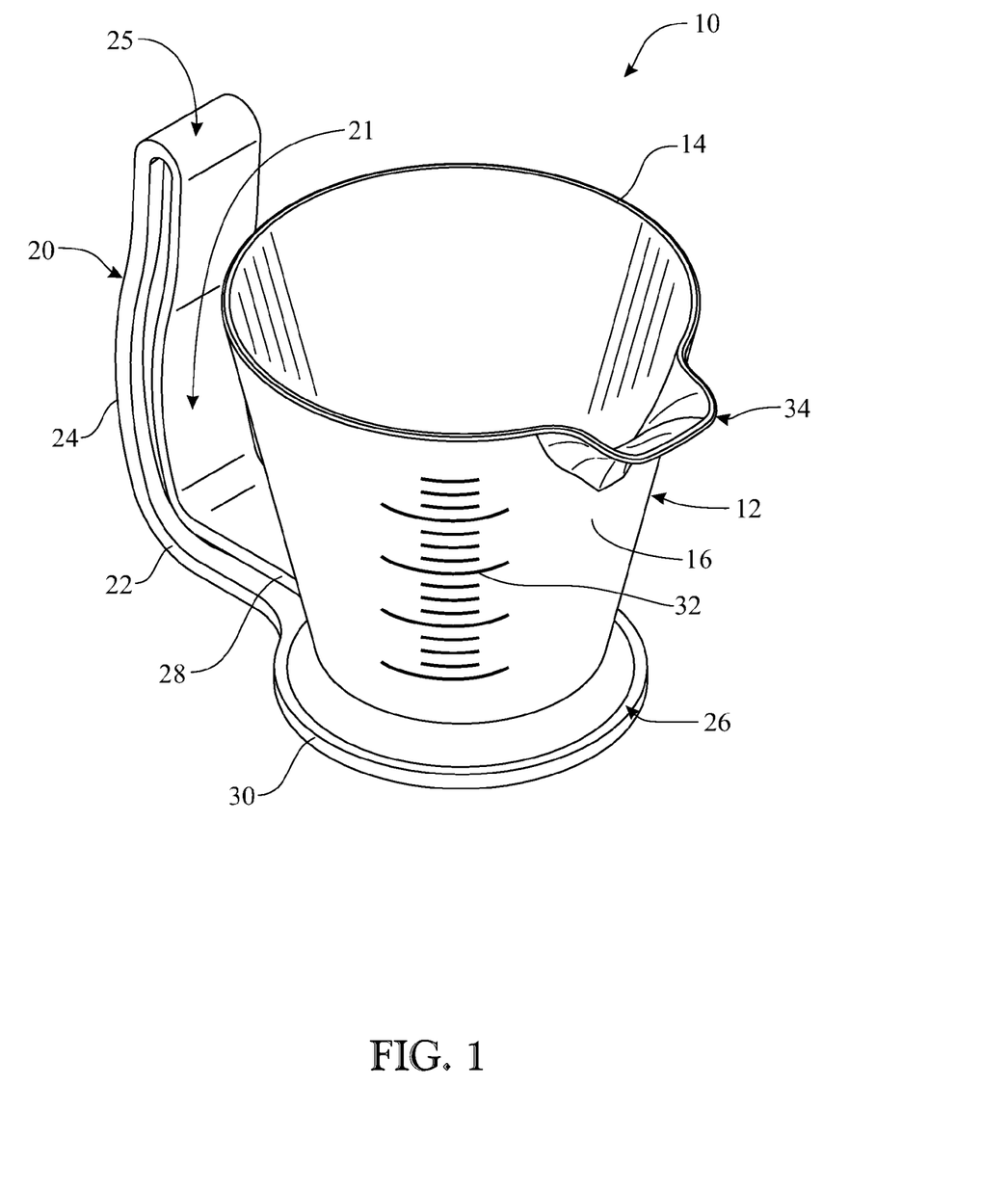
FIG. 1 presents a an isometric view of an exemplary embodiment of a container in accordance with the present invention.
Figure 2:
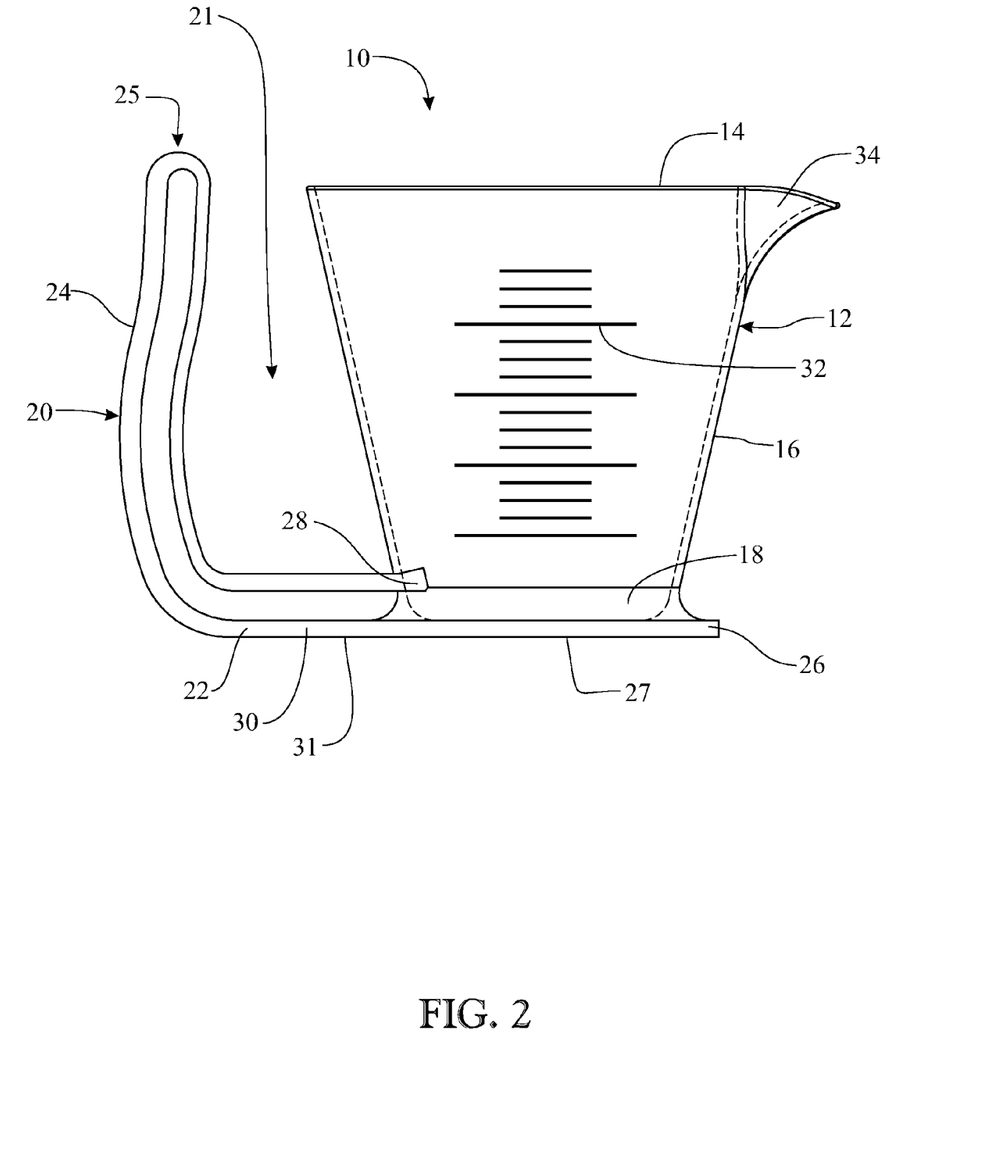
FIG. 2 presents a side elevation view of the container of FIG. 1.

Referring initially to FIGS. 1 and 2, a container 10 is illustrated in accordance with an exemplary embodiment of the present invention. The container 10 includes a container body 12, here illustrated as having a generally frustoconical shape. The container body 12 includes a top rim 14, a side wall 16 and a bottom 18, together defining an interior and an exterior of the container body 12. The container 10 is adapted and constructed to contain flowable material, such as a liquid or flowable solid, and particularly indicated for storing edible substances such as water, milk, flour, sugar, cocoa, or other cooking ingredients.

The container 10 includes a handle 20. In accordance with the invention, the handle 20 presents a hook-like configuration or shape, and extends outwardly from the container body 12 defining an inner hooking space 21. The handle 20 is provided with a connecting portion 22 and a gripping portion 24. The connecting portion 22 and gripping portion 24 are arranged in different directions to form a hook-like configuration, the hooking space 21 being delimited between container body 12, connecting portion 22 and gripping portion 24. In accordance with the invention, hooking space 21 is oriented towards the container body top rim 14. In the present embodiment, the connecting portion 22 extends generally radially outwards from the bottom 18 of the container 10, and the gripping portion 24 extends generally axially upwards from the connecting portion 22, the connecting portion 22 and gripping portion 24 being thereby arranged in a substantially L-shaped configuration. The handle 20 has no connection to the top of the container body 12. The gripping portion 24 is terminated in a free end 25.

In the illustrated embodiment, the container 10 includes an annular base 26. The base 26 protrudes radially outwards from the container bottom 18 and includes a bottom surface 27 configured to contact and stably stand on a flat horizontal surface, lending stability to the container 10 when the container 10 is placed on a horizontal planar surface, such as a counter, tabletop, or other work surface. The handle connecting portion 22 includes a container bottom connection portion 28 connected to the side wall 16 of the container body 12, and a base connection portion 30 connected to the base 26 of the container 10. In the present embodiment, both the container bottom connection portion 28 and the base connection portion are integrally formed with the side wall 16 and base 26, respectively.

Preferably, as best shown in FIG. 2, the base connection portion 30 of connecting portion 22 features a bottom surface 31 that is coplanar to the annular base bottom surface 27, in order to render the container more stable. When the container 10 is placed in a usable position (FIG. 2), both the handle connecting portion bottom surface 31 and the annular base bottom surface 27 will simultaneously and stably stand on a flat horizontal surface, such as a kitchen counter or the like. In the present embodiment, the handle connecting portion bottom surface 31 is in fact a continuation of the annular base bottom surface 27, providing a sleek bottom design that is also less prone to become unclean, as water or solid particles will not tend to accumulate between said surfaces 31, 27.

In order to facilitate using the container 10 as a measuring cup, indicia 32 are preferably provided on the side wall 16 of the container 10. For example, the indicia 32 can define graduated measurement markings on a side wall 16 of the container body 12, and facilitate the process of accurately filling the container with desired amounts of material.

In the present embodiment, a spout 34 is formed on the top of the container body 12, allowing the user of the container 10 to pour flowable material from the container 10 in a clean and controlled manner. The spout 34 is preferably formed on the open top of the container body 12 at a location radially opposite to the handle 20, as shown, to facilitate pouring the materials from inside the container 10 by gripping the handle 20 and tilting the container 10.

The container 10 can be fabricated from any suitable material. It is contemplated that suitable materials include glass, metal, plastic, ceramic, porcelain, rubber, or other suitable material or combination thereof. If the container 10 is fabricated from an opaque material such as metal or ceramic, the indicia 32 can advantageously be provided on an interior surface of the side wall 16 of the container body 12.

Figure 3:
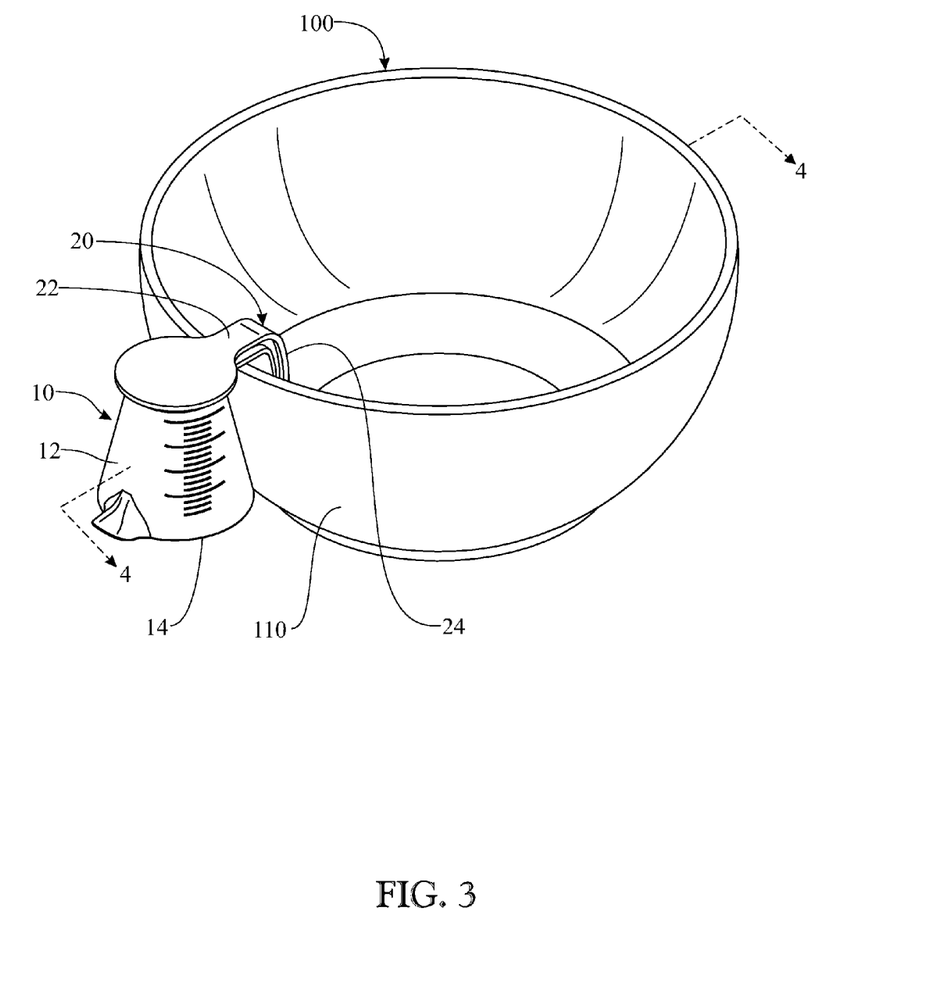
FIG. 3 presents an isometric view of the container of FIG. 1, arranged hanging from a bowl in an inverted position.
Figure 4:
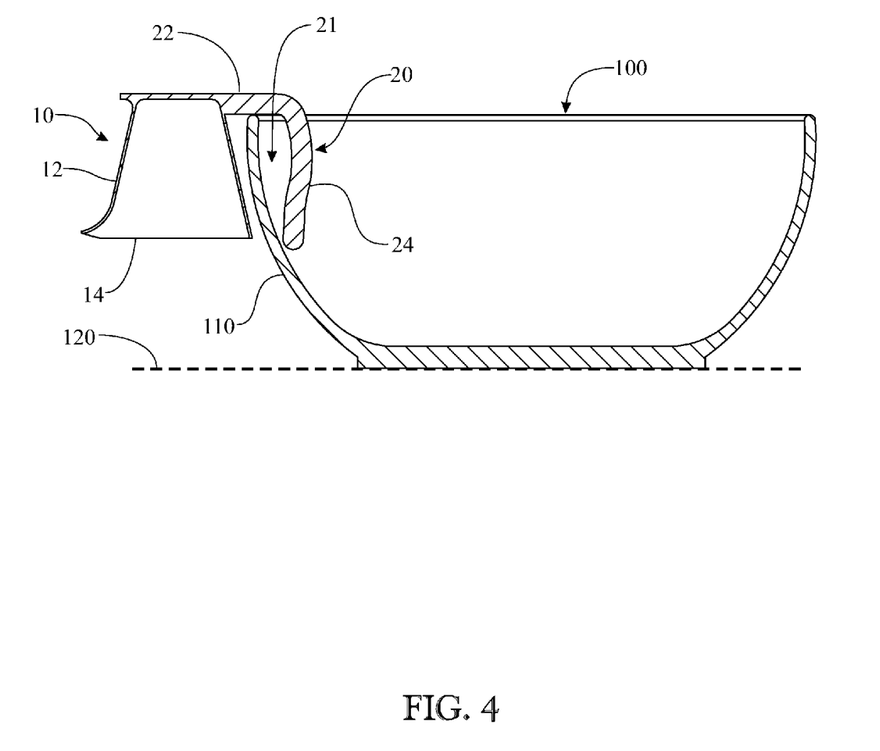
FIG. 4 presents a cross-sectional view of the container and bowl of FIG. 3, the section having been carried out along the section plane indicated by 4-4.

As shown in FIGS. 3 and 4, the container 10 constructed in accordance with the principles of the present invention provides convenient placement onto vertical or sloped surfaces, in a way not achievable with previously known containers. Specifically, the container 10 is shown in an inverted position, hooked to an exemplary mixing bowl 100. This hooked position has been achieved by flipping the container 10 over with respect to its upright position of FIG. 1, inserting a curved side wall 110 of bowl 100 in the container hooking space 21, and allowing the container handle connecting portion 22 to rest on the curved side wall 110 by effect of gravity. The ability to hang in an inverted position as shown in the figures provides several significant advantages. In the first place, while cooking or carrying out other applicable tasks, the container 10 can be temporarily hung and kept within ready reach for subsequent use. In addition, after washing the container, the container 10 can be hung to rinse and dry out as shown; the open top of the container 10 facing downwardly allows the container 10 to drain and thus require less time to dry out and be ready for the next use. Moreover, if the container 10 is hung from a sufficiently tall bowl 100, the container 10 according to the invention is able to hang without the top rim 14 touching a horizontal surface 120 on which the bowl 100 stands, preventing potential contaminants from setting into the interior of the container 10.

Figure 5:
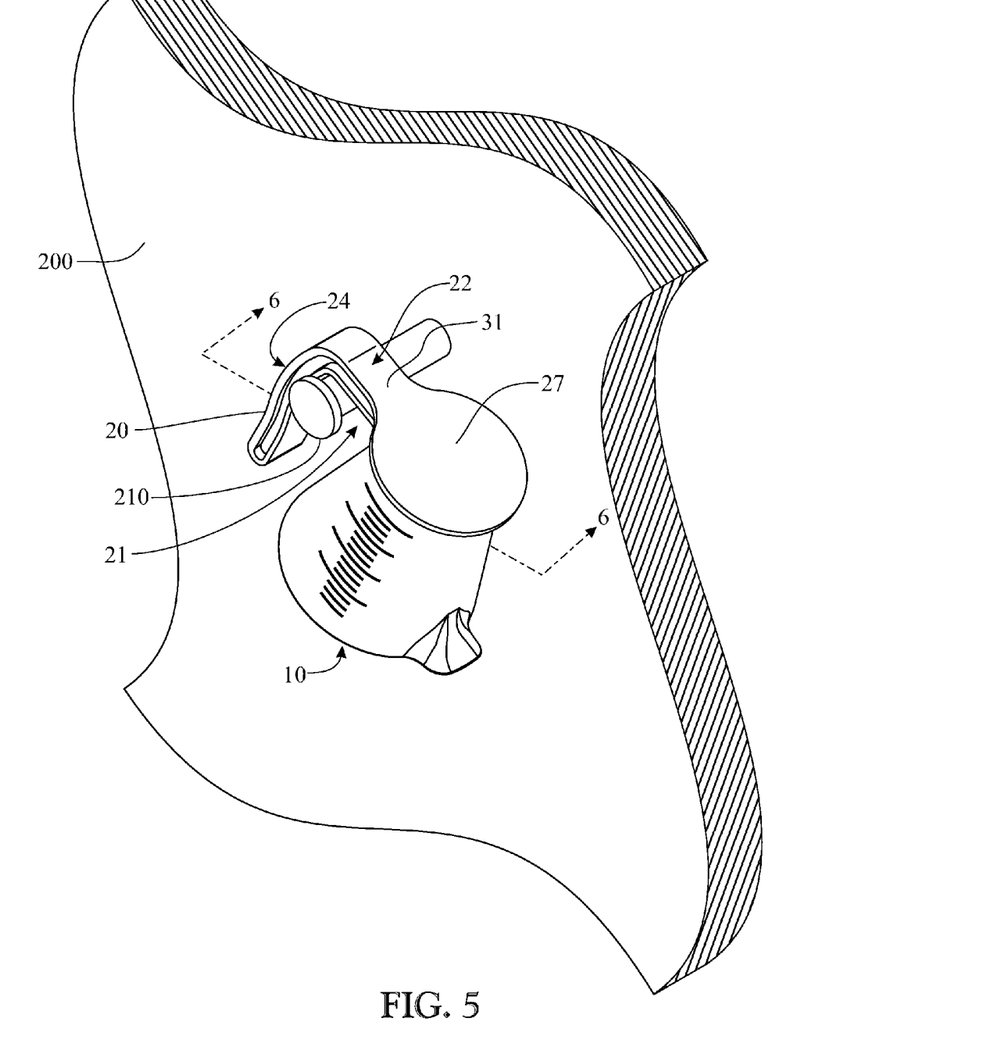
FIG. 5 presents an isometric view of the container of FIG. 1, arranged hanging from a wall-protruding bar.
Figure 6:
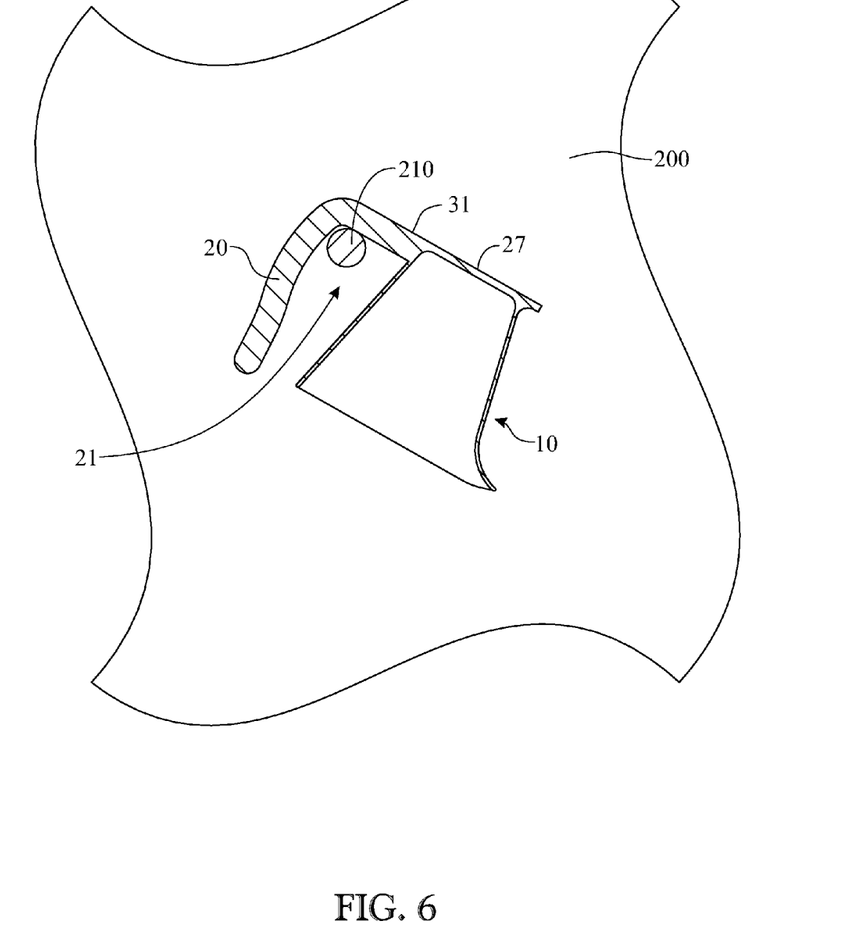
FIG. 6 presents a cross-sectional view of the container and bowl of FIG. 5, the section having been carried out along the section plane indicated by 6-6.

The container 10 constructed in accordance with the present invention can be stored in further ways not achievable with previously known containers. For example, as shown in FIGS. 5 and 6, the "inverted" construction of the handle 20 allows the user to employ a method of hooking the handle 20 of the container 10 on an elongate element extending horizontally from a generally planar vertical surface, here shown as a peg 210 extending from a wall 200. In this storage position, the peg 210 remains partially inside the container hooking space 21 while the handle gripping portion 24 and connecting portion 22 rest on the peg 210. In turn, the top rim 15 and open top of the container 10 face downwardly, while the container body 12 and top rim 14 hang in the air. Again, such an inverted hanging arrangement provided by the invention not only allows the container 10 to drain, but also guarantees the container is kept clean and non-contaminated while stored or dried out in a hanged position.

In the present embodiment, the container handle 20 is integrally formed with the container body 12, providing a mechanically robust yet cost-effective solution for constructing a container body 12 capable of being hanged from a container handle 20 in an inverted position.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A container for containing flowable material, said container comprising:
    a container body having an open top defining a top rim, a bottom, and at least one side, the container body being adapted and constructed to contain flowable material; and
    a handle, comprising:
        a connecting portion extending outwardly from the container body in a first direction, and
        a gripping portion extending from said connecting portion in a second direction different to said first direction, said gripping portion terminating in a free end, the free end being arranged closer to the open top than the connecting portion, wherein
        said connecting portion and said gripping portion are arranged in a hook-like configuration; whereby
    a hooking space is delimited between said container body, said connecting portion, and said gripping portion, said hooking space being oriented towards the open top.

2. The container of claim 1, wherein the connecting portion extends outwardly from the bottom of the container body.

3. The container of claim 1, wherein the connecting portion extends radially from the container body.

4. The container of claim 1, wherein the gripping portion extends axially towards the container body rim.

5. The container of claim 1, further comprising a spout formed on the top rim of the container body.

6. The container of claim 5, wherein the spout is arranged radially oppositely to the handle.

7. The container of claim 1, further comprising a base comprising a bottom surface for stably resting on a flat surface.

8. The container of claim 7, wherein the connecting portion extends at least partially from the base.

9. The container of claim 8, wherein the connecting portion comprises a bottom surface that is coplanar to the bottom surface of the base.

10. The container of claim 7, wherein said base protrudes radially outwardly from the bottom of the container body.

11. The container of claim 1, wherein the container is formed from at least one of glass, plastic, metal, ceramic, porcelain, rubber and any combination thereof.

12. The container of claim 1, wherein the container handle and the container body are integrally formed.

13. The container of claim 1, further comprising indicia defining graduated measurement markings on at least one side of the container body.

14. A container for containing at least one solid or fluid material, said container comprising:
   a container body having an open top defining a top rim, a closed bottom, and at least one side wall, the container body being adapted and constructed to contain at least one solid or fluid material; and
   a hook-shaped handle protruding from the body and oriented towards the open top, where a free end of the hook-shaped handle is arranged closer to the open top than a connecting portion between the free end and the container body, said hook-shaped handle defining an inner hooking space oriented towards said open top;
   a base comprising a bottom surface for stably resting on a flat surface; and
   wherein the connecting portion comprises a bottom surface that is coplanar to the bottom surface of the base such that both the bottom surface of the connecting portion and the bottom surface of the base are configured to simultaneously and stably stand on the flat surface.

15. The container of claim 14, wherein the connecting portion extends radially from the container body and the gripping portion extends axially towards the container body rim.

16. The container of claim 14, wherein the connecting portion extends at least partially from the bottom surface of said closed bottom, and coplanar to said bottom surface.

17. A container for containing solid or fluid substances, said container comprising:
   a container body having a base, side walls, and an open top defining a top rim, the container body being adapted and constructed to contain solid or fluid substances; and
   a handle formed integral to the container body, said handle consisting of:
      a connecting portion extending outwardly from the container body, and
      a gripping portion extending from said connecting portion, said gripping portion terminating in a free end, the free end being arranged closer to the open top than the connecting portion, wherein
      said connecting portion and said gripping portion are arranged in a L-shaped configuration; whereby
   a hooking space is delimited between said container body, said connecting portion, and said gripping portion, said hooking space being oriented towards the open top;
   a base comprising a bottom surface for stably resting on a flat surface; and
   wherein the connecting portion comprises a bottom surface that is coplanar to the bottom surface of the base such that both the bottom surface of the connecting portion and the bottom surface of the base are configured to simultaneously and stably stand on the flat surface.

18. The container body of claim 17, wherein the connecting portion extends outwardly from the base of the container body.

19. The container of claim 17, wherein said base protrudes radially outwardly from the bottom of the container body.

* * * * *